Patented June 6, 1950

2,510,119

UNITED STATES PATENT OFFICE 2,510,119

PRODUCTION OF TANNIN AND SOFT-GRIT BLASTING MATERIAL FROM NUTSHELLS

Elbert C. Lathrop, Peoria, Ill., assignor to the United States of America as represented by the Secretary of Agriculture No Drawing. Application April 20, 1948,
Serial No. 22,233

10 Claims. (Cl. 260—473.6)

(Granted under the act of March 3, 1883, as
amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the processing of nut shells whereby a variety of valuable products are produced. More particularly, the invention relates to a method for processing nut shells to produce such valuable products as a concentrated tannin-bearing material, soft-grit blasting material, improved fillers for plastics and the like, involving comminuting the broken pieces of certain types of nut shells whereby the physical components of the shells are separated in the form of discrete particles. The invention is moreover directed to the subsequent recovery of the several components in fractions, each of which is more valuable than the unprocessed nut fragments themselves or the ground mixture obtainable by the usual grinding methods.

This invention has among its objects the provision of a process whereby tannin-bearing nut shells are treated by mechanical means to separate the outer hard shell fragments from the inner tannin-rich portions.

A further object is the preparation of a fraction from comminuted nut shells in which is concentrated substantially all the tannin thereby producing a composition of matter from which tannin may be recovered simply and economically for example by extraction. In some instances this tannin concentrate may be used directly as a tanning material without extraction.

A further object of the invention is to provide a process whereby the hard outer shell is recovered as a comminuted product that is substantially free from water-solubles and color-imparting material, and thus has enhanced utility as an ingredient such as an extender and filler for plastic compositions, as a soft-grit blasting material, as an ingredient in hand soaps or for other purposes in which a clean, dense and inert material is desired.

Nut shells are a byproduct of the various nut growing or packaging industries, and heretofore have been of comparative small economic value. They have found limited use as a source of activated carbons and as a source of lignocellulose material to be used in the form of flour as fillers in plastic compositions.

Certain nut shells, such as pecan shells, in the form of the large pieces as they come from the nut cracking operation, have been extracted with water for the purpose of recovering the tannin materials. These materials are present in relatively minor amounts and a large quantity of shells must be extracted in order to recover a given amount of tannin. Moreover, because of the physical nature of the cracked shells, the use of relatively large amounts of aqueous solvent and consequent dilute solutions of tannin are encountered, all of which result in economic disadvantages.

It has been found that the tannin material present in the nut shells of nuts of the hickory nut family, i. e. genus Hicora (or Carya) or filberts (of the genus Corylus) is concentrated in the brown or red colored material which forms the inner lining of the shells and/or the partition between the nut meat sections, and that the shell itself contains very little tannin. In the case of the varieties of pecans investigated the tannin content of the outer, hard shell ranges from one-half to slightly over one percent on a moisture free basis, whereas the tannin content of the inner linings ranges from 25 to nearly 50 percent.

In addition to the above uses, it has been proposed to use ground nut shells as soft-grit blasting material. The ground material from nuts such as those mentioned above contains an excessive amount of dust that has no value as a blasting medium and which results in considerable wastage when ground shells are used for this purpose.

When nut shells are ground by conventional means, such as attrition mills, disk mills, mullers or rollers the shells are crushed to a pulverant or powdered material containing substantially all the components of the original shells in about the original proportions. The colored or tannin-bearing material, most of which clings tenaciously to the shell, is intimately mixed into the ground product.

In accordance with the invention, the nut shells in the form of relatively large pieces are subjected to comminution operation which involves a shattering of the shells by shock or impact. I have discovered that this type of comminution flicks or peels away the colored paper-like material from the shells in the form of a light weight powdery product, and an efficient separation of this tannin-bearing material from the shell material proper is thus accomplished. The comminuting is preferably carried out by setting the hammer mill or other impact device so that the shell product is relatively coarse. This affords a very simple mechanical separation of the tannin-rich fraction from the shell fraction. The shell fraction may be used as a dustless soft-grit blasting material or may then be further pulverized to furnish an improved light colored ingredient for hand soaps, filler for plastics and the like.

In addition to the hammer mill, the shattering of the nut shells by impact may be accomplished by other well-known devices; for example, by a modification of the disk mill in which the attrition plates are replaced by plates bearing intermeshing coarse teeth. This modification has been termed the "devil tooth" mill. The raised teeth of the plates strike the nut shells and provide sufficient impact effect for separation of the two fractions. Another device is one which has been termed the "double squirrel cage mill." This device operates on the principle of two sets of elongated bars or teeth which form squirrel cages. One cage revolves inside the other cage which may be stationary or revolve in the opposing section. Still another device is one which operates by means of a set of paddles or vanes radially arranged which revolve at high speed inside a cylindrical casing. The nut shells are shattered by being thrown by the vanes against the cylindrical casing.

The invention has among its advantages the preparation of a small fraction from the nut shells which has concentrated therein all the valuable tannin material, so that the pure tannin materials may be recovered by extraction in a greatly increased concentration and by handling a minimum of extractant material. It has the further advantage of the preparation of a nut shell fraction that is freed from the dust-forming and color-imparting component that has impaired the utility of prior nut shell products. For example, nut shell flour made in accordance with this invention contains a minimum of water-soluble and of color-imparting material, and when used as a filler in plastics results in a lighter colored and a more water-resistant product. Furthermore, ground nut shells produced in accordance with this invention may be used as an abrasive ingredient in hand soaps without imparting the dark color characteristic of the usual ground nut shells when placed in contact with alkalis.

The nut shells to which this invention applies are those which contain the light weight red or brown colored component as a lining inside the shell and occasionally as partitions between sections of nut meats. This general type of shells may be termed tannin-bearing nut shells, since the aforesaid component is rich in tannin material. Examples of such nuts are those of the genus Hicoria, or the genus Corylus, and the like. In all, a considerable proportion of the tannin-bearing component clings tightly to the shell. In most cases, and particularly in the case of pecan shells, it is difficult to separate it cleanly from the shell with a sharp knife blade. In view of this, it is surprising that the relatively simple shattering action of an impact comminuting operation will accomplish a clean separation from the shell.

The invention is illustrated but not limited by the following specific examples:

*Example 1*

Nut shell fragments of paper shell pecans, such as produced by conventional nut cracking machines are subjected to the action of a hammer mill. In this particular experiment the hammer mill was fitted with a screen having 1/8 inch diameter round openings.

The product had the following analysis:

|  | Per cent |
|---|---|
| +U. S. No. 8 | 1.8 |
| —U. S. No. 8+10 x 10 Tyler mesh | 26.8 |
| —10 x 10 Tyler mesh+28 x 30 Tyler mesh | 56.0 |
| —28 x 30 Tyler mesh | 15.4 |

The above screen separation resulted in a good demarcation of the products by color and density. The first three fractions were light in color and dense; whereas the material passing the 28 x 30 Tyler mesh was dark colored and light in weight. This fourth fraction consisted of a fine reddish colored product, light and fluffy in comparison with the other fractions. The first three fractions comprised nut shell fragments which had been practically completely cleaned of all adhering colored material. It could be ground to a light colored flour.

The fourth fraction was assayed qualitatively and found to be rich in tannins; whereas the shell fractions gave only a slight indication of the presence of tannins even after prolonged extraction with boiling water.

*Example 2*

Filbert shells were comminuted in a hammer mill fitted with the same screen as in Example 1. The product was screened on a vibrating screen into the following fractions:

|  | Parts by weight |
|---|---|
| +28 x 30 Tyler mesh | 6.5 |
| —28 x 30 Tyler mesh | 1.7 |

The lesser fraction was dark in color and light in weight and was rich in tannin-bearing materials. It contained some fine nut shell fragments.

Visual observation indicated that the material retained on the screen contained an appreciable amount of light weight, darker colored tannin-bearing material in the form of flakes or flakes and fibrous particles. Considerable amounts of this light weight material could be blown from the surface of a handful of that fraction. It was accordingly subjected to air separation. By simple visual experimentation, the separator was adjusted to produce a light weight fraction exclusive of dense shell fragments. The light weight fraction was rich in tannin-bearing material and consisted of about one-fourth part of the total weight. There resulted the following final separation:

Nut shell fragments _____ 6.25 parts (76.2 percent) by weight
Tannin-bearing material __ 1.95 parts (23.8 percent) by weight qualitative assays produce substantially the same results as obtained in Example 1.

*Example 3*

Filbert shells were comminuated in the hammer mill as in Example 2. The comminuted product gave the same screen fractionation as that of Example 2. The product in this case was subjected to air separation alone, the separating device was adjusted so as to give a clean separation of nut shell fragments and the lighter weight fraction. This determination was easily possible merely by visual inspection of the products. The separation was as follows:

Light colored, dense _____ 1.55 parts (86.6 percent) by weight
Darker colored, light weight __ 0.24 part (13.4 percent) by weight The dense fraction was essentially clean and bright. It consisted of nut shell fragments proper from which all light weight material had been removed. The light weight fraction contained substantially all the tannin-bearing material present in the original shells, and moreover contained a minimum of fine shell fragments. Its contents of tannins was considerably more concentrated than the corresponding product of Example 2.

The operation of the impact comminuting device preferably should be controlled so that the nut shell fragments are not comminuted too fine. Best separations are obtained when a substantial proportion of the product consists in relatively coarse fragments. It is obvious that the comminution need not be carried to any specific degree of fineness. For example, the hammer mill used in Examples 1 to 3 can be fitted with other screens, such as $\frac{1}{16}$-inch openings. It is only necessary that the product be shattered sufficiently to separate the adhering colored material from the shell fragments.

The process of this invention is applicable only to nut shells containing appreciable amounts of tannin-bearing material. The advantages of the invention are realized only with such nut shells. An example of shells to which the invention does not apply is English walnut shells. Although the shattering action of hammer mill or other impact device results in fine, as well as coarse fragments, when walnut shells are treated as in the examples, the total product contains little if any tannin-bearing material.

When employed with the type of nut shells contemplated in this invention, impact comminution renders the separation of the two fractions very easy. Sufficient control for practical purposes can be accomplished by mere eye observation. As expressed previously, the nut shell fragments proper are lighter in color and denser; whereas, the tannin-bearing component is usually darker in color and is lighter in weight. The more significant of the two differences is the density, although in most cases color differences are also pronounced.

The separation is accomplished in some cases by a simple screen separation as illustrated in Example 1. It may likewise be accomplished as illustrated in Example 2 by a combination of screen separation and air separation. It is more practicably accomplished by air separation alone, as illustrated in Example 3. This may be done, for example, by placing a cyclone separator in the pneumatic system of a hammer mill or other impact device. Air separation, either alone or in conjunction with screen separation, is preferable in nearly every case, since there will usually be present fragments or fractions of the tannin-rich material of such size that they will not be separated by screening alone. Moreover, in cases where a more finely comminuted product is produced, the greater density of even small shell particles facilitates separation of the two fractions by pneumatic means.

The hammer mill, as employed in the above examples, is a device well-known in the art. It is sometimes called a "swing hammer" and functions through the impact action of a plurality of bars hinged to a central shaft or disk.

The term "relatively coarse" used herein to denote the size of the fragments of nut shells refers to particles having a maximum diameter range of from $\frac{1}{32}$ to $\frac{1}{4}$ inch.

In the impact or shattering action, the cleavage of the tannin-bearing material from the nut shell proper is accomplished satisfactorily with nut shells sufficiently dry to be brittle or shatterable. Air dry nut shells were used in the above examples. Shells which have been previously dried by artificial means may also be used.

The extraction of tannin from the powdery fraction obtained according to my invention may be accomplished by conventional methods. For example, the fraction may be extracted with hot water at atmospheric or superatmospheric pressures. Of course, other solvents may be used, for example, organic solvents, such as acetone, alcohol, or amyl acetate.

Having thus described my invention, I claim:

1. A process comprising subjecting tannin-bearing nut shells to the shattering action of an impact comminution thereby causing cleavage of the inner tannin-bearing material from the outer nut shell material proper as a light weight powdery product, and separating the tannin-bearing light weight powdery material from the nut shell fragments.

2. A process for recovering valuable products from nut shells comprising subjecting tannin-bearing nut shells to the shattering action of an impact comminution thereby causing the tannin-bearing material to separate from the nut shell material proper as a light weight powdery product, separating the tannin-bearing material from the nut shell fragments and further comminuting the latter fragments.

3. A process comprising subjecting pecan shells to shattering action of impact comminution thereby causing cleavage of the tannin-bearing material from the nut shell material proper as a light weight powdery product, and separating the tannin-bearing material from the nut shell fragments.

4. A process comprising subjecting filbert shells to the shattering action of impact comminution thereby causing the cleavage of the tannin-bearing material from the nut shell material proper as a light weight powdery product, and separating the tannin-bearing material from the nut shell fragments.

5. A process comprising subjecting nut shells having a lining of tannin-bearing material to the shattering action of an impact comminution, removing the comminuted material from the comminution as the nut shell particles are reduced to a size that will pass through holes having a diameter in the range of about $\frac{1}{32}$ to $\frac{1}{4}$ inch, and physically separating the coarser particles of nut shell from the tannin-bearing light-weight powder.

6. The process of preparing nut shell flour having a minimum of color-imparting material, comprising the process of claim 5 in which the separated coarser particles are finely ground.

7. The process of claim 5 in which the light-weight powder is treated to remove tannin.

8. A process comprising subjecting nut shells having a lining of tannin-bearing material to the shattering action of an impact comminution to form a relatively coarse fraction comprising nut shell fragments having a maximum diameter range of from 1/32 to 1/4 inch and just sufficiently to cause cleavage of the inner tannin-bearing material as a light weight powdery product; and subjecting the comminuted material to pneumatic separation to form a light colored dense fraction low in tannin and a darker colored light weight fraction containing the tannin-bearing material.

9. A process of preparing a tannin extract comprising preparing a darker colored light weight fraction as recited in claim 8 and subjecting it to a tannin extraction process.

10. A process of preparing a fine grit low in or substantially free of tannin comprising preparing a light colored dense fraction as described in claim 8 and further communicating the fraction.

ELBERT C. LATHROP.

REFERENCES CITED

The following references are of record in the file of this patent:

UNITED STATES PATENTS

| Number | Name | Date |
|---|---|---|
| 211,316 | Bennett | Jan. 14, 1879 |
| 230,991 | Bennett | Aug. 10, 1880 |
| 306,434 | Savigny | Oct. 14, 1884 |
| 1,755,573 | Clement | Apr. 22, 1930 |
| 1,838,560 | Lykken | Dec. 29, 1931 |
| 1,875,045 | Leshner et al. | Aug. 30, 1932 |
| 1,975,731 | Parsons | Oct. 2, 1934 |
| 2,319,182 | Van der Pyl | May 11, 1943 |
| 2,446,551 | Pauly | Aug. 10, 1948 |